United States Patent
Kajimura et al.

(10) Patent No.: US 10,257,437 B2
(45) Date of Patent: Apr. 9, 2019

(54) IMAGING APPARATUS AND CONTROL METHOD FOR POSITIONING A PLURALITY OF IMAGES CONTINUOUSLY CAPTURED BY AN IMAGE SENSOR

(71) Applicant: CANON KABUSHIKI KAISHA, Tokyo (JP)

(72) Inventors: Fumihiro Kajimura, Kawasaki (JP); Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/658,678

(22) Filed: Jul. 25, 2017

(65) Prior Publication Data

US 2018/0041716 A1 Feb. 8, 2018

(30) Foreign Application Priority Data

Aug. 2, 2016 (JP) ................... 2016-151637

(51) Int. Cl.
| | |
|---|---|
| *G06T 5/00* | (2006.01) |
| *H04N 5/232* | (2006.01) |
| *H04N 5/265* | (2006.01) |
| *H04N 5/374* | (2011.01) |

(52) U.S. Cl.
CPC ............ *H04N 5/265* (2013.01); *G06T 5/003* (2013.01); *H04N 5/23254* (2013.01); *H04N 5/23267* (2013.01); *H04N 5/23277* (2013.01); *H04N 5/374* (2013.01); *G06T 2207/20132* (2013.01); *G06T 2207/20201* (2013.01)

(58) Field of Classification Search
CPC . G06T 2207/20132; G06T 2207/20201; G06T 5/003; H04N 5/23254; H04N 5/23267; H04N 5/265; H04N 5/374
See application file for complete search history.

(56) References Cited

U.S. PATENT DOCUMENTS

| | | | |
|---|---|---|---|
| 2006/0204043 A1* | 9/2006 | Takei | H04N 5/23248 382/107 |
| 2008/0187234 A1* | 8/2008 | Watanabe | H04N 1/3876 382/254 |
| 2010/0245604 A1* | 9/2010 | Ohmiya | G03B 5/00 348/208.99 |
| 2012/0230606 A1* | 9/2012 | Sugiyama | H04N 1/3876 382/284 |

(Continued)

FOREIGN PATENT DOCUMENTS

JP H09-261526 A 10/1997

*Primary Examiner* — Amy R Hsu
(74) *Attorney, Agent, or Firm* — Venable LLP

(57) ABSTRACT

An imaging apparatus that performs positioning of a plurality of images that has been continuously captured by an image sensor includes at least one memory, and at least one processor coupled to the at least one memory. The at least one processor functions as a detection unit configured to detect a difference in position between the images captured by the image sensor, a drive unit configured to drive a shake correction unit that optically corrects image blur of each image based on the difference in position detected by the detection unit, and a coordinate transformation unit configured to perform positioning of the images in which the image blur has been corrected by the shake correction unit, based on the difference in position detected by the detection unit.

12 Claims, 11 Drawing Sheets

(56) References Cited

U.S. PATENT DOCUMENTS

| | | | | |
|---|---|---|---|---|
| 2015/0036009 A1* | 2/2015 | Takizawa | ........... | H04N 5/23274 |
| | | | | 348/208.6 |
| 2015/0085149 A1* | 3/2015 | Tsubaki | ............. | H04N 5/23277 |
| | | | | 348/208.4 |
| 2016/0057352 A1* | 2/2016 | Yoneda | .............. | H04N 5/23251 |
| | | | | 348/208.4 |

* cited by examiner

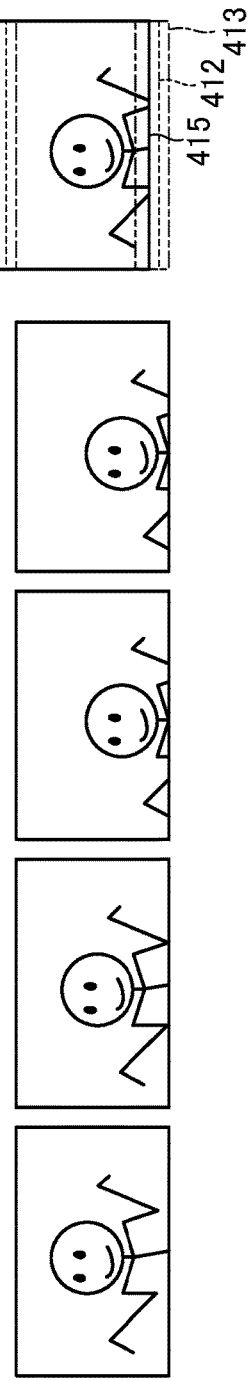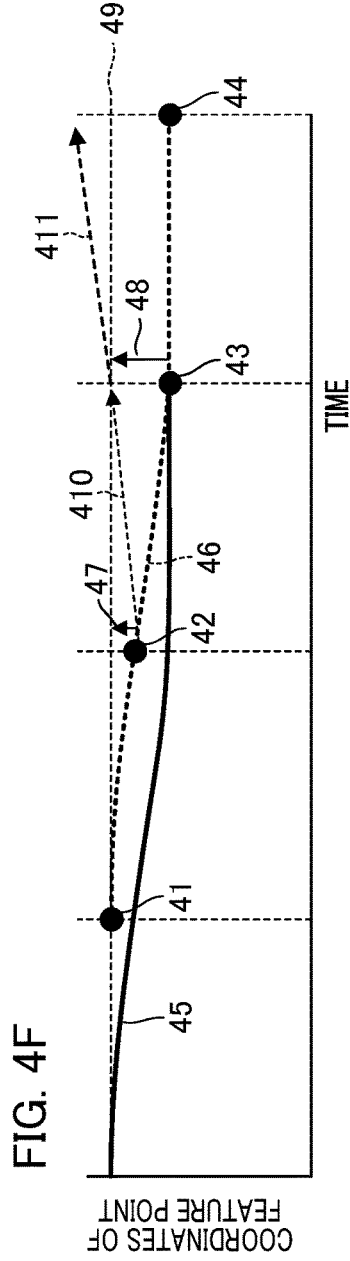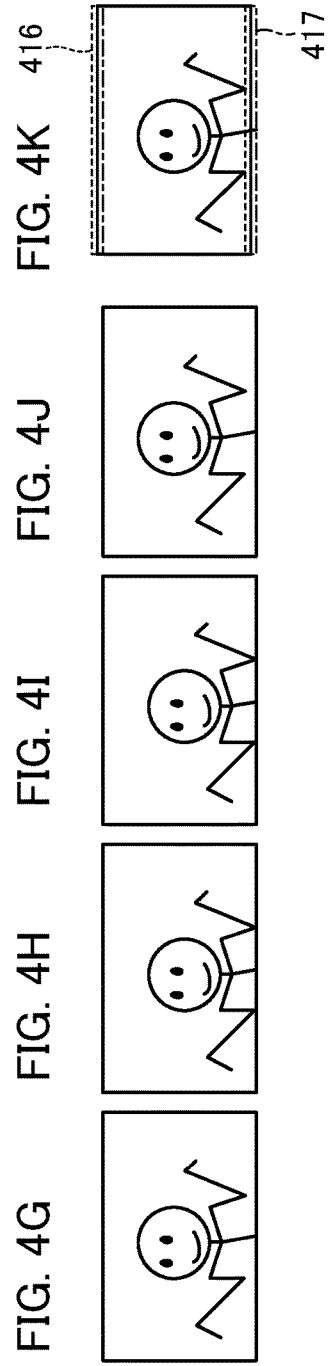

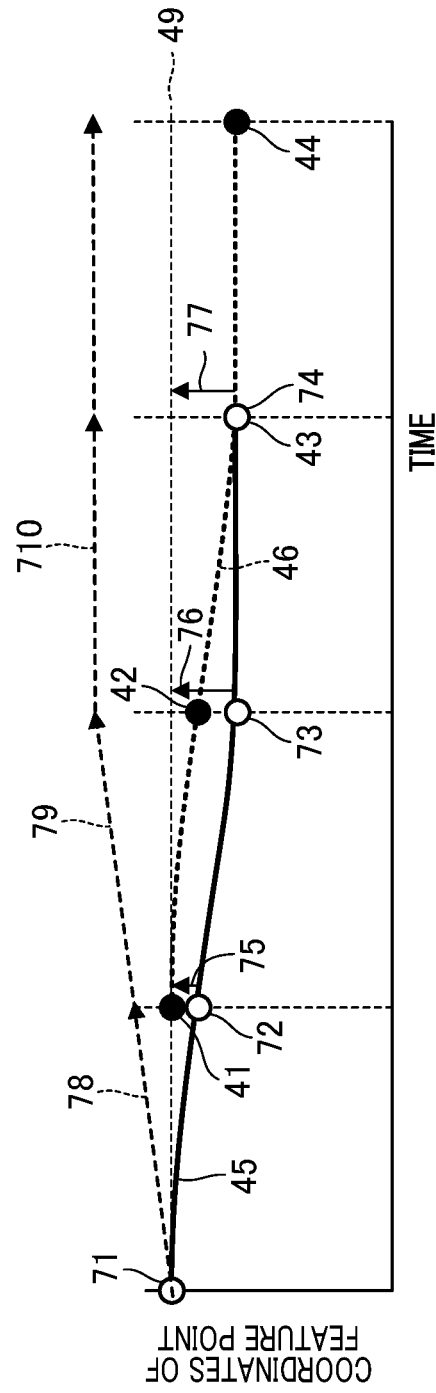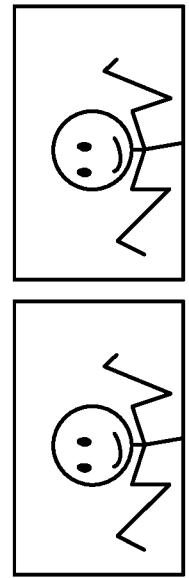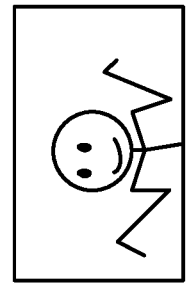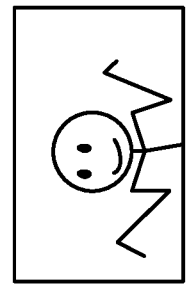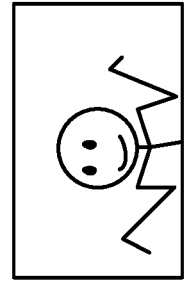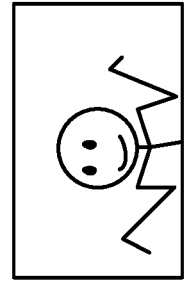

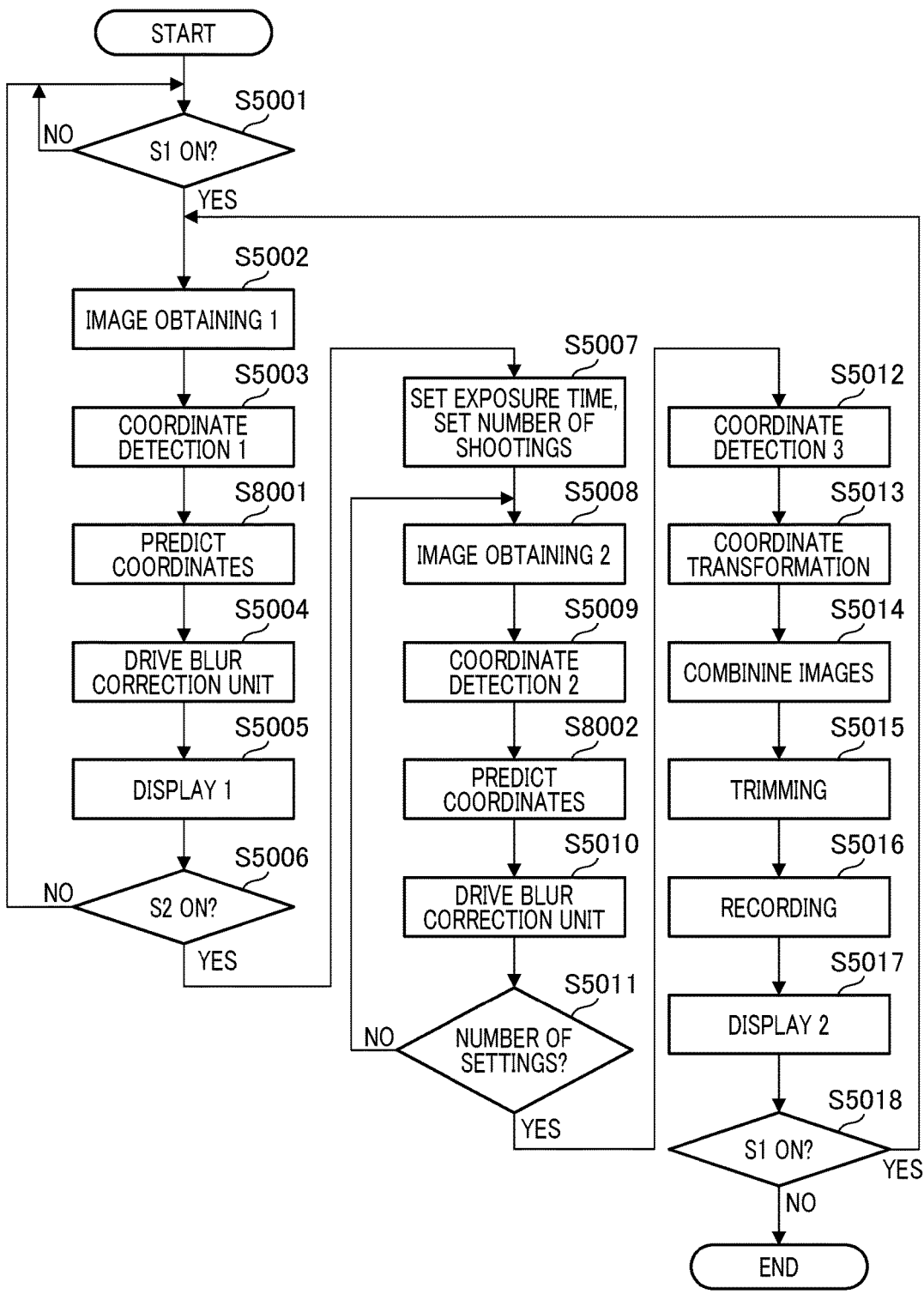

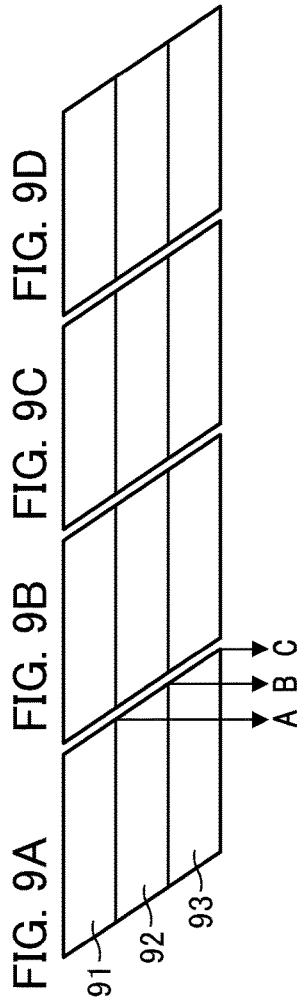
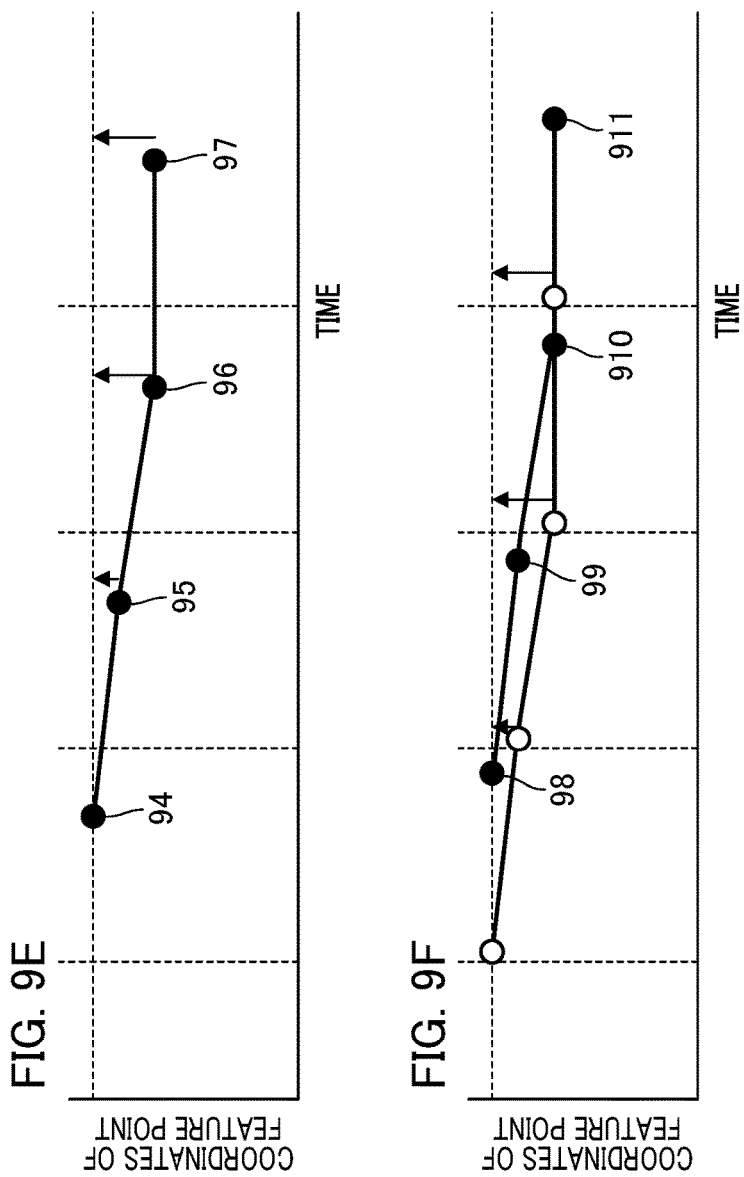

IMAGING APPARATUS AND CONTROL METHOD FOR POSITIONING A PLURALITY OF IMAGES CONTINUOUSLY CAPTURED BY AN IMAGE SENSOR

This application claims the benefit of Japanese Patent Application No. 2016-151637, filed Aug. 2, 2016, which is hereby incorporated by reference herein in its entirety.

BACKGROUND OF THE INVENTION

Field of the Invention

The present invention relates to an imaging apparatus and a control method of controlling an imaging apparatus.

Description of the Related Art

In order to suppress the influence of image blur due to hand shaking and the like during camera hand-held shooting, there is a conventional technique that generates an image having a sufficient exposure in which image blur is suppressed by shooting and combining a plurality of images with a short exposure time at which the image blur appears with difficulty. Japanese Patent Application Laid-Open Publication No. 9-261526 discloses an image combining and anti-shake technique that obtains an image equivalent to an image with a long exposure time in which the image blur is suppressed by performing positioning of a plurality of images captured in a short time and combining the images.

As disclosed in Japanese Patent Application Laid-open No. 9-261526, however, if the image equivalent to one with a long exposure time is obtained by using only a region with a sufficient exposure amount where images overlap each other, a region with an insufficient exposure amount caused by deviation of the images due to the image blur is trimmed, and, as a result, the output image is small.

SUMMARY OF THE INVENTION

The present invention provides an imaging apparatus that suppresses positional deviation of an object image between images if the images that have been continuously shot are combined.

One aspect of the present invention provides an imaging apparatus that performs positioning of a plurality of images that has been continuously captured and combines the images. The imaging apparatus includes an imaging unit, a detection unit configured to detect a difference in position between the images captured by the imaging unit, and a drive unit configured to drive a shake correction unit that optically corrects image blur of the image based on the difference in position detected by the detection unit. The imaging apparatus also includes a coordinate transformation unit configured to perform positioning of the images in which the image blur has been corrected based on the difference in position detected by the detection unit, and an image combining unit configured to combine the images to which the positioning has been performed by the coordinate transformation unit and to generate a combined image.

Further features of the present invention will become apparent from the following description of exemplary embodiments with reference to the attached drawings.

BRIEF DESCRIPTION OF THE DRAWINGS

FIGS. 4A to 4K illustrate an effect of a blur correction unit in the first embodiment.

FIGS. 7A to 7F illustrate the correction of a difference in composition between images during imaging in the second embodiment.

FIG. 8 is a flowchart of an imaging operation in the second embodiment.

FIGS. 9A to 9F illustrate characteristics of a CMOS in the second embodiment.

DESCRIPTION OF THE EMBODIMENTS

First Embodiment

Figure 1:
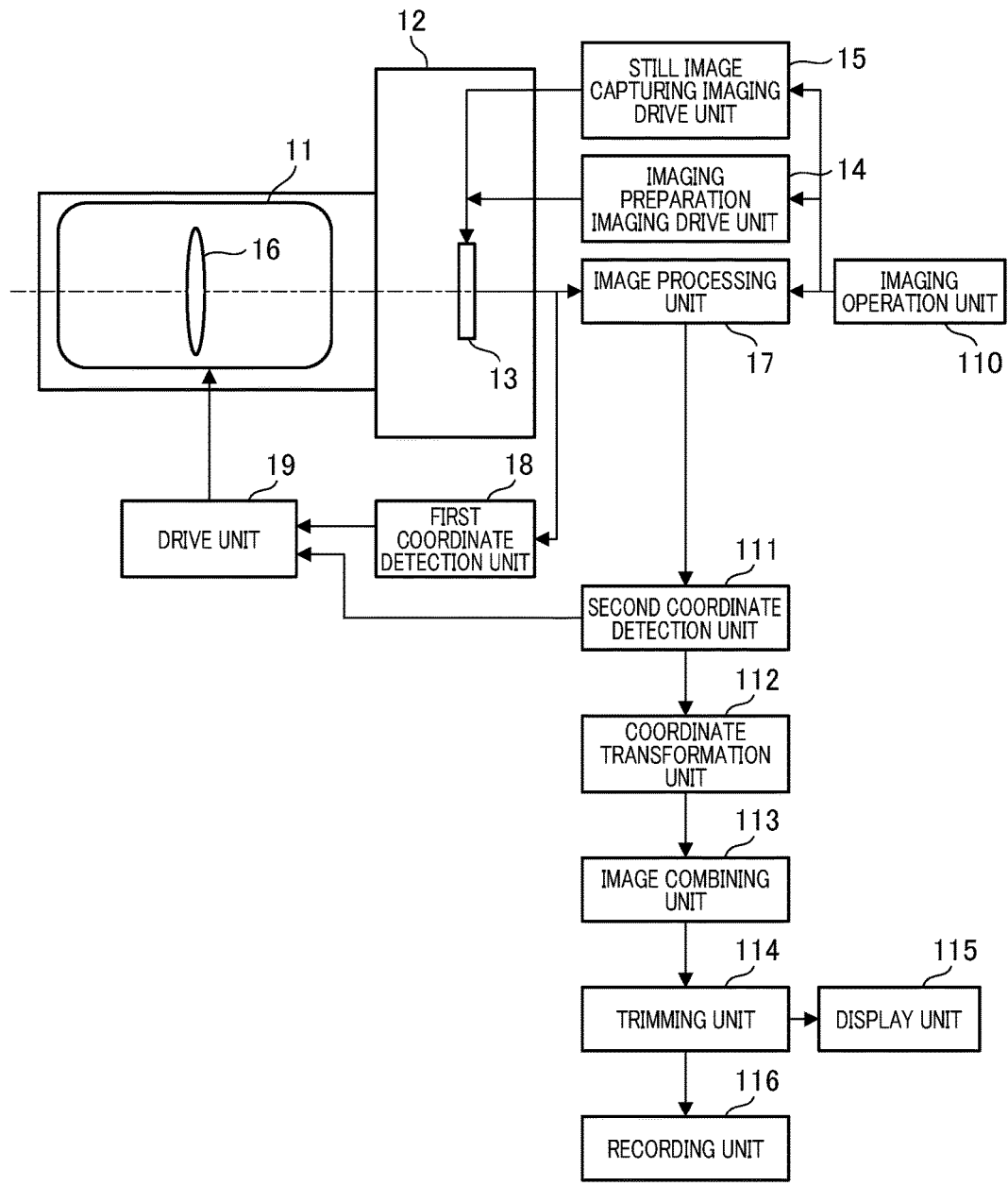
FIG. 1 is a block diagram that illustrates a configuration of an imaging apparatus in the first embodiment.

FIG. 1 is a block diagram illustrating a configuration of an imaging apparatus. In the present embodiment, the imaging apparatus in which a camera body and a lens are integrated will be described as an example. The invention is not limited to this embodiment, however, and a lens apparatus that is attachable and detachable to and from the camera body serving as an imaging apparatus may be used. The imaging apparatus according to the first embodiment includes an imaging optical system 11 serving as a lens and a camera body 12. The camera body 12 has, for example, an imaging unit 13 having an imaging element, such as a CMOS image sensor and a CCD image sensor, a drive unit that drives and controls an imaging unit 13 and the lens, a detection unit that detects coordinates from an image, a processing unit that performs an image process, and an image combining unit that performs image combining.

An imaging preparation imaging drive unit (preparation drive unit) 14 drives the imaging unit 13 for observing an object prior to capture, and a still image capturing imaging drive unit (imaging drive unit) 15 drives the imaging unit 13 for capturing still images. A blur correction unit 16 optically corrects image blur applied to the camera body 12 by moving a part of a lens group that is the imaging optical system 11. An image processing unit 17 performs a signal process including a signal input of the imaging unit 13 and a formation of luminance signals and color signals on the signal, and further performs gamma correction and a compression process. A first coordinate detection unit 18 obtains coordinates of each image output from the imaging unit 13 in chronological order. More specifically, the first coordinate detection unit 18 obtains the coordinates at a predetermined feature point of the image obtained by the imaging unit 13, and also obtains the coordinates at the identical feature point in the next image to be obtained. A drive unit 19 drives the blur correction unit 16 based on the output of the first coordinate detection unit 18. Note that an imaging light flux subjected to blur correction by the blur correction unit 16 is incident to the imaging unit 13 so that coordinate information from the first coordinate detection unit 18 becomes the coordinate information of blur correction remainder of the blur correction unit 16. Then, the blur correction unit 16 is driven so as to reduce an amount of the blur correction remainder of the imaging unit 13, whereby the deterioration of the observed image due to image blur during object observation is reduced.

An imaging operation unit 110 performs the adjustment of focusing and the diaphragm and the opening and closing control of a shutter (not illustrated) by an operation of a photographer, and then starts capturing a plurality of still images. Signals from the imaging operation unit 110 are input to the imaging drive unit 15 or the preparation drive unit 14, and the imaging unit 13 performs image obtaining for still image capturing and for the preparation thereof by the operation of the imaging operation unit 110. An exposure time by the opening and closing control of the shutter is set to be short enough to make image deterioration due to image blur not conspicuous. Additionally, since the image deterioration due to image blur becomes conspicuous as the focal length of the imaging lens is longer, the exposure time is also changed in accordance with the focal length.

If the exposure time is short, however, the exposure amount is insufficient while the image deterioration due to image blur is small. Accordingly, a plurality of images that has been captured continuously with a short exposure time is sequentially combined to compensate for the insufficient exposure amount. Hence, the number of images obtained by the imaging unit 13 is determined by the exposure time for each captured image and an appropriate exposure time for a combined image to be generated. For example, if the exposure time for each captured image needs to be shortened even though the focal length of the imaging optical system 11 is long, a main object becomes dark and a long time is thus needed for the appropriate exposure for the combined image, whereby the number of captured images increases.

If images of a plurality of images that have been continuously captured are combined, the composition of each image changes slightly due to image blur between imaging. Additionally, the image deteriorates due to combining the images in which each composition slightly changes. Hence, in the present embodiment, the positioning of each image is performed prior to image combining in order to suppress the image deterioration due to image blur. A second coordinate detection unit 111 detects coordinates of each composition of the plurality of images sequentially obtained by the imaging unit 13. More specifically, coordinates of a feature point shared in each image, such as a pupil of the main object, are obtained for each image.

Figure 2:
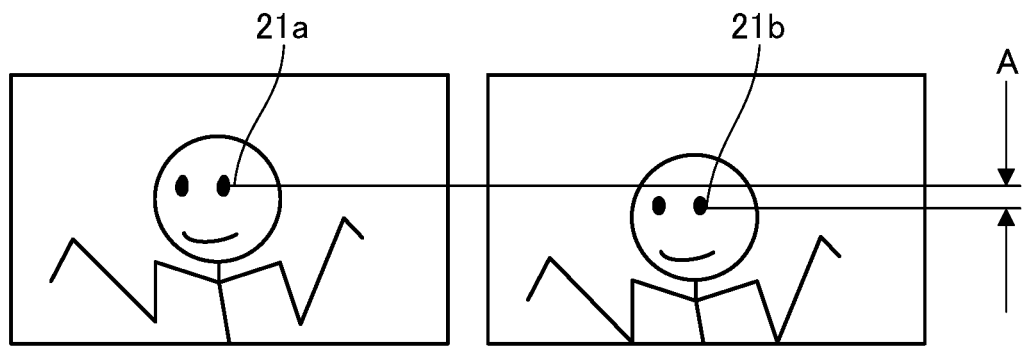
FIG. 2 illustrates detection of a difference in composition between images.

With reference to FIG. 2, a description will be given of the second coordinate detection unit 111, a coordinate transformation unit 112, and an image combining unit 113. FIG. 2 illustrates images sequentially stored. First, the second coordinate detection unit 111 sets a main object left pupil 21a to serve as a feature point in the image of FIG. 2. Next, the coordinates of the feature point that has been set (a main object left pupil 21b) are obtained in the right image of FIG. 2 captured next to the left image of FIG. 2 by the imaging unit 13. In FIG. 2, the coordinates of the feature point shift upward and downward by an amount "A" due to image blur. A deviation amount of the coordinates of this feature point is commonly referred to as a "motion vector".

The coordinate transformation unit 112 shifts one of the images based on the coordinates obtained by the second coordinate detection unit 111. For example, a difference in composition between the images is corrected by shifting the right image of FIG. 2 by the amount "A" by using the left image of FIG. 2 to serve as a reference, that is, by shifting the right image of FIG. 2 based on a deviation amount of the coordinates of the feature point with respect to the left image of FIG. 2. The image combining unit 113 combines the images in which the coordinates have been transformed by the coordinate transformation unit 112. Two images are used here for an explanation. Even when combining more than two images, however, the second coordinate detection unit 111 detects the coordinates of the feature point of each image, and the coordinate transformation unit 112 corrects a difference in composition between the images, and the image combining unit 113 combines the images in which coordinates have been transformed to optimize exposure.

Figure 3:
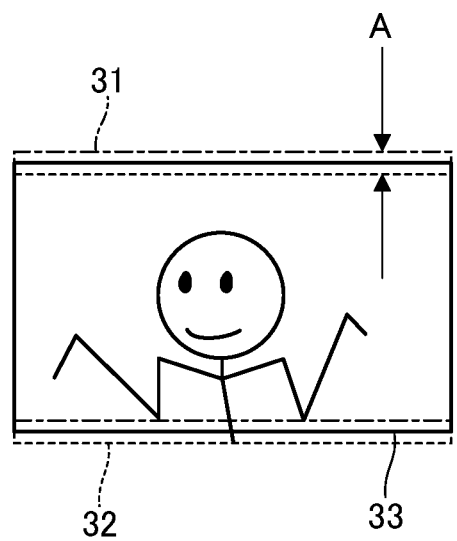
FIG. 3 illustrates a difference in composition between images during imaging and the correction thereof in the first embodiment.

With reference to FIG. 3, a trimming unit 114 will be described. FIG. 3 illustrates a difference in composition between the images during continuous imaging and correction thereof. The trimming unit 114 cuts an extra region made after combining the images and adjusts the size of the image. In FIG. 3, a frame 31 shown by a one-dot chain line is the left image of FIG. 2, a frame 32 shown by a dashed line is the right image of FIG. 2, and the images are combined by shifting the positions of each image only by the amount "A". A trimming frame 33, shown by a solid line, is a trimming frame having a size that is the same as the frame 31 shown by a one-dot chain line and the frame 32 shown by a dashed line, and is located at the center position between the two images. An image extending beyond the trimming frame 33 is cut by the trimming unit 114. Note that the trimming frame 33 is not limited to be set at the center of the two images, and may be set at a position that is the same as the first frame at which combining starts. A display unit 115 displays the image trimmed by the trimming unit 114 on a rear liquid crystal of the camera body 12. Additionally, a recording unit 116 records the trimmed image.

FIG. 4 illustrates an effect of the blur correction unit 16 according to the present embodiment. First, a case in which the blur correction unit 16 is not driven will be considered. FIG. 4A to FIG. 4D are images continuously obtained by the imaging unit 13 if the blur correction unit 16 is not driven, and each image is slightly different in composition due to image blur.

Solid black circles 41 to 44 in FIG. 4F are the result of a difference in composition between the images in the images of FIG. 4A to FIG. 4D due to image blur shown by a solid line 45 being represented as coordinate information. In a case in which the coordinate calculation operation time is set to be extremely short, the timing for obtaining the coordinate information is obtained immediately after all the image signals have been obtained. That is, the coordinates at the start of image obtaining are obtained one frame later, which is after the image obtaining has completed. The change of the coordinates is shown by a dashed line 46.

FIG. 4G to FIG. 4J are images continuously obtained by the imaging unit 13 if the blur correction unit 16 is driven. The blur correction unit 16 is driven as shown by arrows 47 and 48 so that the coordinates approach a dashed line 49 that serves as a reference, based on the coordinate information of the solid black circles 42 and 43. The images in FIG. 4A to FIG. 4D become the images in FIG. 4G to FIG. 4J, respectively, by driving the blur correction unit 16, and a difference in composition between the images can be reduced.

In FIG. 4G to FIG. 4J, even though the blur correction is performed, a slight difference in composition is caused between the images. This slight difference is caused by the fact that the detection of the coordinates is delayed by approximately one frame after the image has been obtained.

For this reason, the image of FIG. 4H is different in composition from the image of FIG. 4G that is the initial stage of the image obtaining. Additionally, even if there is no difference in composition between the images as shown by the solid black circles 43 to 44, such a change due to delay of image acquisition timing cannot be immediately reflected in the blur correction. Accordingly, FIG. 4J is different in composition from FIG. 4I. Due to the occurrence of a slight difference in composition, matching of the feature point (coordinate transformation) of each image is performed also at the stage of combining each image after blur correction.

Note that, in the above description, the case in which the blur correction unit 16 is driven by only the amounts of arrows approaching the dashed line 49 in the intervals between the image obtaining (for example, between FIG. 4C and FIG. 4D) has been described, but the present invention is not limited to such a case. For example, it may be possible that the blur correction unit 16 is driven to move linearly by a difference between the coordinate information for before and after the images while the image is being exposed, by giving drive target values shown by the dashed arrows 410 and 411 in FIG. 4F. Additionally, the coordinates detected in a case in which the blur correction is not performed are used as a reference for an explanation. Actually, however, the coordinates found for obtaining the coordinates while performing blur correction are the ones in which the difference in composition remains after correction. Therefore, the coordinate actually obtained is somewhat different from the solid black circles 41 to 44 of FIG. 4F.

FIG. 4E illustrates the result of combining the images of FIG. 4A to FIG. 4D in the case in which the blur correction unit 16 is not driven. As a result of combining the images by performing positioning of the main object, the imaging regions of each image are different as shown by a dashed line 412, a one-dot chain line 413, and a two-dot chain line 414. Accordingly, if trimming is performed along the solid line 415, many areas exist in which the exposure is insufficient because the number of combined images in the region is insufficient. That is, it is impossible to obtain a high quality image.

FIG. 4K illustrates a result for combining the images of FIG. 4G to FIG. 4J in a case in which the blur correction unit 16 is driven. As a result for combining the images by performing positioning of the main object, different imaging regions are made, as shown by a dashed line 416 and a one-dot chain line 417. This is due to a difference in composition between the images caused by a delay of the coordinate signal described above. The difference between imaging regions of each image is small, however, and the number of combined images during trimming along the solid line is sufficient to ensure a proper exposure, and, as a result, an image with a quality higher than that of FIG. 4E can be obtained.

Figure 5:
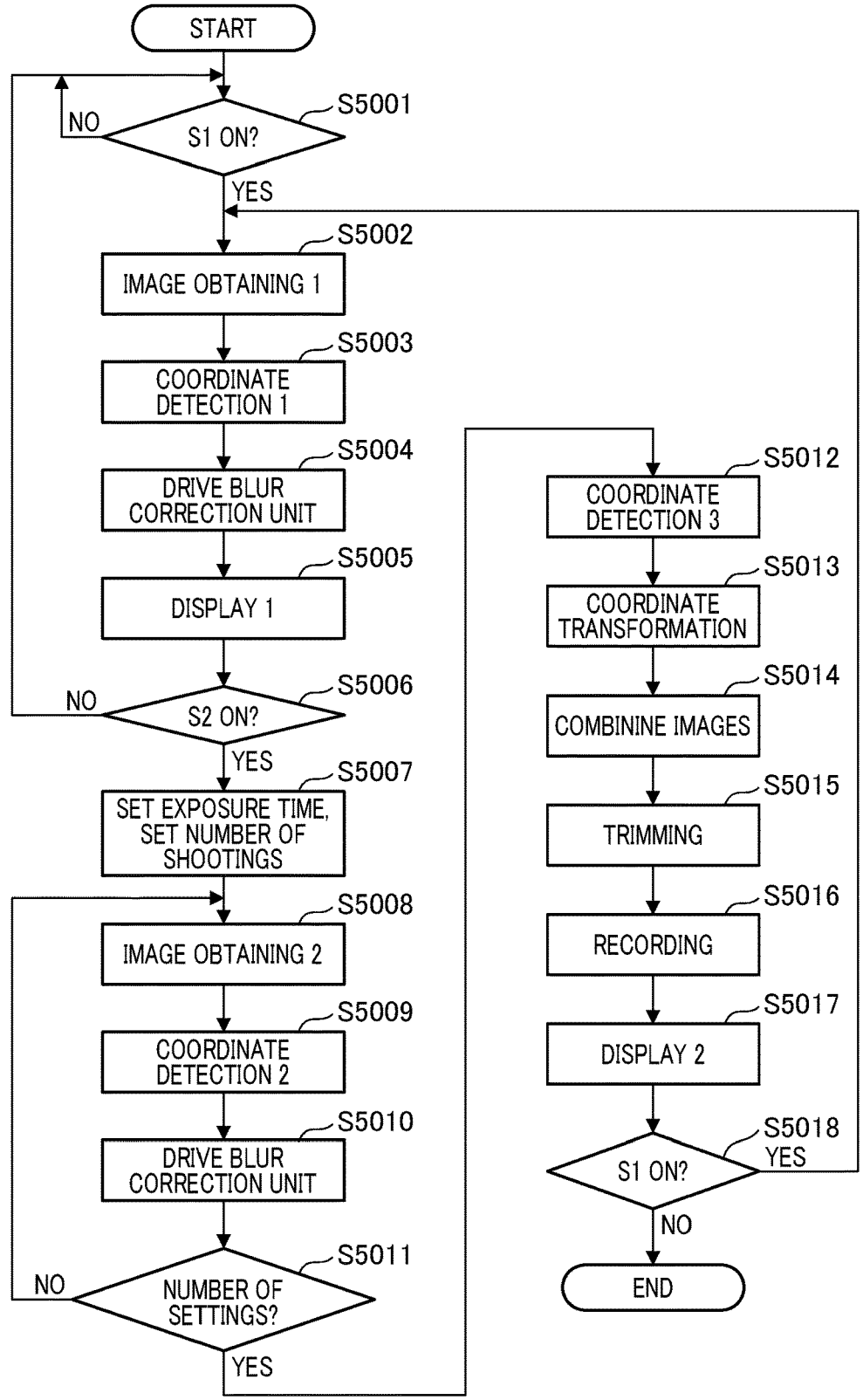
FIG. 5 illustrates a flowchart of an imaging operation in the first embodiment.

FIG. 5 is a flowchart illustrating a flow of the imaging operation of the first embodiment. For an easy explanation, steps that are not directly related to the present embodiment in the operation flow of the imaging apparatus will be omitted. The flow of FIG. 5 starts upon turning on a main power supply of the imaging apparatus. In step S5001, the process stands by cycling this step before the half-pressing of the release button (S1) that is the imaging operation unit 110, and the process proceeds to step S5002 upon the half-pressing of the release button (S1 on). The half-pressing of the release button (S1) is an operation for imaging preparation.

In step S5002, the imaging unit 13 obtains an image in accordance with the input of the preparation drive unit 15 (image obtaining 1). This image obtaining is performed for determining an imaging composition in advance prior to imaging. Accordingly, the imaging size may be smaller than that in the image obtaining in step S5009, to be described below, due to the thinning-out of the imaging signal and the like. In step S5003, the first coordinate detection unit 18 detects the coordinates of a desired feature point of the image obtained in step S5002 (coordinate detection 1). In step S5004, the drive unit 19 drives the blur correction unit 16 based on the coordinates detected in step S5003 and optically corrects image blur. In step S5005, the image obtained in step S5002 is displayed on the display unit 115 (display 1). Therefore, an image with less deterioration due to image blur is displayed on the display unit 115 prior to imaging, and the deterioration of the observed image due to image blur during the observation of the object can be reduced.

In step S5006, the processes from step S5001 to step S5006 are circulated until an imaging (exposure start) instruction is provided by the depression of the release button (S2 on) that is the imaging operation unit 110. In step S5007, if an instruction for exposure start is provided, the imaging drive unit 14 sets an exposure time allowable for image blur in accordance with the focal length of the imaging optical system 11. For example, if the focal length is denoted by "f", the exposure time is set to 1/f. Additionally, the imaging drive unit 14 sets the number of images to be continuously captured in accordance with the brightness of the imaged object and the exposure time that has been set. For example, if the exposure time set for a captured object is a length of ¼ with respect to the exposure time proper for the imaged object, the capturing of four images is set. Note that all that is required is to obtain an image with a brightness equivalent to that obtained by capturing with a proper exposure time, by combining the images. For example, if the exposure time set for a captured object is a length of ¼ with respect to the exposure time proper for the captured object, performing imaging of five or more images may also be possible.

In step S5008, the imaging unit 13 obtains an image based on an instruction provided from the imaging drive unit 14 (image obtaining 2). In step S5009, the first coordinate detection unit 18 detects the coordinates of the image obtained in step S5008 (coordinate detection 2). In step S5010, the drive unit 19 drives the blur correction unit 16 based on the coordinates detected in step S5009 and optically corrects image blur. Here, image blur may optically be corrected based on an amount of the deviation between the coordinates of the feature point of the image obtained in step S5008 and the coordinates of the feature point of the image obtained before step S5008. In step S5011, the continuous imaging is performed by cycling the processes from step S5008 to step S5011 until the number of captured images set in step S5007 is reached. If the imaging of the number of images that has been set ends, the process proceeds to step S5012.

In step S5012, the second coordinate detection unit 111 detects coordinates of the feature point of each image obtained in step S5010 (coordinate detection 3). In step S5013, the coordinate transformation unit 112 performs coordinate transformation on the correction remaining of the blur correction unit 16 and corrects it. In step S5014, the image combining unit 113 combines the images in which the compositions are matched with each other by performing the coordinate transformation in step S5013. Thus, for example, a combined image as shown in FIG. 4K can be obtained. Here, if an extra image has been obtained so that the total exposure time is longer than the proper exposure time, an image having the largest correction remaining may be excluded from an image to be combined. In step S5015, the trimming unit 114 trims the combined image to be a proper image size and generates a recorded image.

In step S5016, the recorded image is recorded in the recording unit 116 of step S5015. In step S5017, the recorded image is displayed on the display unit 115 (display 2). In step S5018, it is determined whether or not the half-pressing of the release button (S1 on) is continuing. While the half-pressing continues, the process returns to step S5002 and the above-described flow is repeated. If the half-pressing of the release button is canceled, this flow ends.

As described above, the composition change due to image blur while obtaining a plurality of images is reduced by driving the blur correction unit 16 based on the coordinate signal during image obtaining, and then the positioning of the images are performed and the images are combined, whereby it is possible to obtain a high-quality image with fewer insufficiently exposed regions.

Second Embodiment

Figure 6:
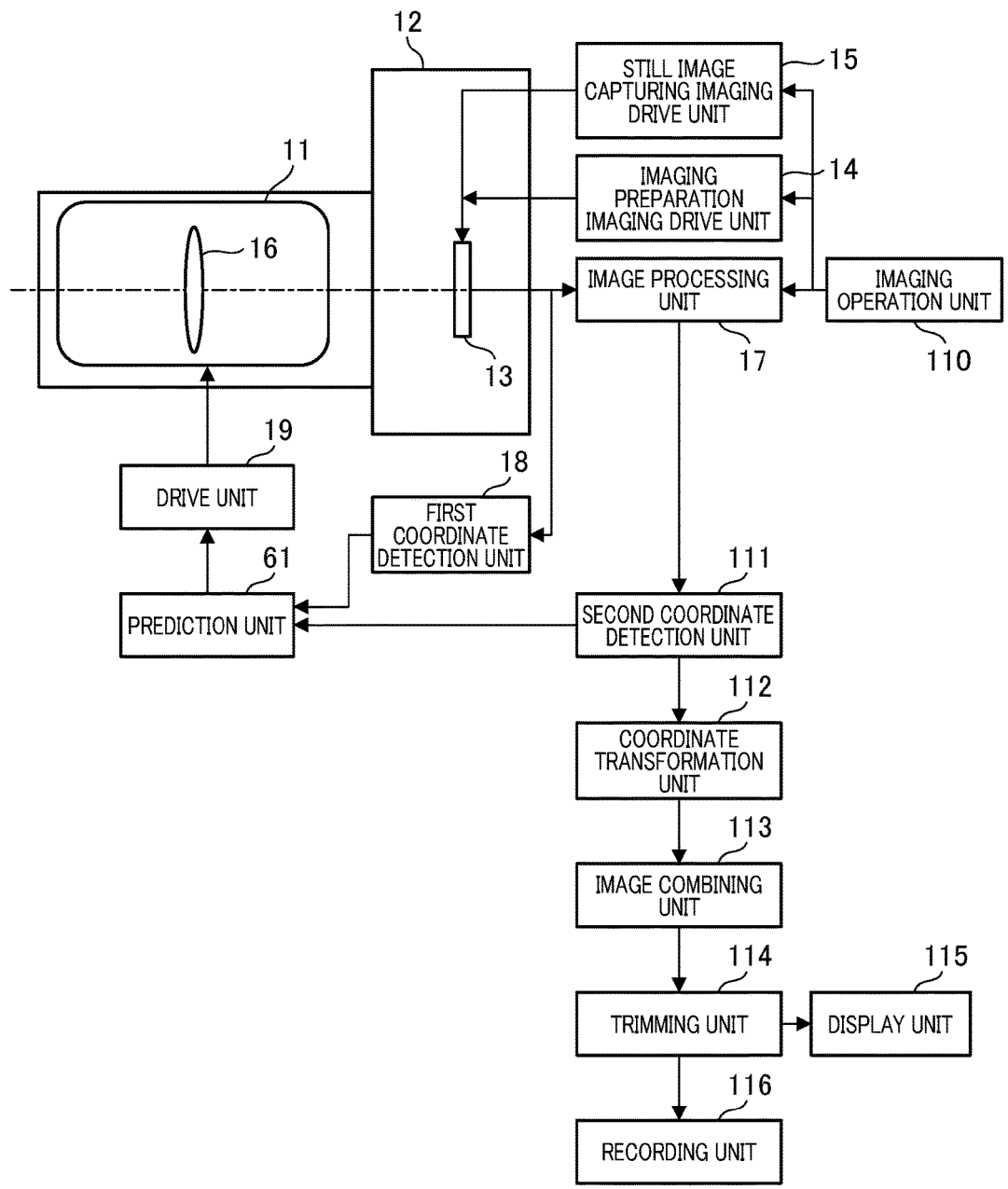
FIG. 6 illustrates a block diagram illustrating a configuration of the imaging apparatus in the second embodiment.

FIG. 6 is a block diagram illustrating a configuration of an imaging apparatus to which the second embodiment is applied. FIG. 6 is different from FIG. 1 in that a prediction unit 61 is provided. The prediction unit 61 predicts the next signal based on the current signal and the signal earlier than that signal. The prediction unit 61 is configured by a known technique such as a Kalman filter. The prediction unit 61 predicts the next coordinate signal based on the coordinate signals obtained from the first coordinate detection unit 18 and the second coordinate detection unit 111, and outputs the predicted result to the drive unit 19. The drive unit 19 drives the blur correction unit 16 based on the predicted result.

As described in the first embodiment, since the coordinate signals indicating the difference in composition between the continuous images are obtained after the image signals have been obtained, the coordinate signal is delayed by approximately one frame from the time when the image signal has been obtained. The prediction unit 61 predicts the next coordinate signal based on the coordinate signal obtained currently and the coordinate signal obtained at an earlier time. Therefore, it is possible to obtain a signal indicating the difference in composition of the image at the time that the image is obtained.

FIG. 7 illustrates an effect of the blur correction unit in the second embodiment. The solid black circles 41 to 44 in FIG. 7A represent the same coordinate information as in FIG. 4F. In contrast, black outline circles 71 to 74 are the results obtained by processing the solid black circles 41 to 44 by the prediction unit 61. The black outline circles 71 to 74 overlap the image blur shown by the solid line 45 since they are similar to the result obtained by detecting the difference in composition of the image without delay to serve as coordinate information at the start timing of the image obtaining.

Based on the coordinate information of the black outline circles 72 to 74, the blur correction unit 16 is driven as shown by arrows 75 to 77 so that the coordinates approach the dashed line 49 that serves as a reference. The images in FIG. 4A to FIG. 4D become the images in FIG. 7B to FIG. 7E, respectively, by driving the blur correction unit 16, and the difference between compositions can be reduced. Note that the drive of the blur correction unit 16 is not limited to the drive as shown by the arrows 75 to 77. For example, it may be possible for drive target values as shown by dashed arrows 78, 79, and 710 to be given, and the blur correction unit 16 is driven so as to move linearly only by a difference between the coordinate information before and after the image while the image is being exposed. Additionally, in a manner similar to the description with reference to FIG. 4F, also in FIG. 7A, the coordinates detected in a case in which the blur correction is not performed are used as a reference for an explanation. Actually, however, the coordinates found for obtaining the coordinates while performing blur correction are the ones in which the difference in composition remains after correction. Therefore, the black outline circles 71 to 74, that are coordinates actually obtained, are somewhat different from those in FIG. 7A.

FIG. 7F illustrates the result obtained by combining the images of FIG. 7B to FIG. 7E that is the case in which the blur correction unit 16 is driven, by performing positioning of the main object. In FIG. 7F, a deviation in imaging regions of each image of FIG. 7B to FIG. 7E is small, so that it is possible to obtain an image with a quality higher than that of FIG. 4K obtained by the imaging apparatus not having the prediction unit 61.

FIG. 8 is a flowchart illustrating a flow of the imaging operation according to the second embodiment. In FIG. 8, the same reference numerals are appended to the steps that are the same as those in the flowchart (FIG. 5) of the first embodiment, and the description thereof will be omitted. In step S8001, the prediction unit 61 predicts a coordinate signal that is one frame ahead based on the coordinate signals detected in step S5003 sequentially transmitted from the first coordinate detection unit 18. The predicted coordinate signal (prediction signal) is transmitted to the drive unit 19. In step S5004, the drive unit 19 drives the blur correction unit 16 based on the predicted signal. Accordingly, it is possible to reduce deterioration of the observed image due to image blur while observing the object with high accuracy.

In a similar manner, in step S8002, the prediction unit 61 predicts a coordinate signal that is one frame ahead based on the coordinate signal detected in step S5008 that has been sequentially transmitted from the first coordinate detection unit 18. The predicted coordinate signal (prediction signal) is transmitted to the drive unit 19. In step S5010, the drive unit 19 drives the blur correction unit 16 based on this prediction signal. As a result of this operation, a difference in composition almost disappears between the captured images.

A blur correction error due to mechanical friction and an insufficient control of the blur correction unit 16 is, however, also included. Accordingly, the coordinates of the image captured again in step S5012 and step S5013 are obtained and coordinate transformation is performed, whereby this error is further reduced. As described above, in the second embodiment, by providing the prediction unit 61, it is possible to predict and to detect a difference in composition between the images at the time that the images are obtained and to further improve the quality of the combined image.

If the imaging unit 13 is a CMOS image sensor, the read-out timing of the feature point changes depending on the position of the feature point on the screen. By utilizing this characteristic, it is also possible to obtain early the difference in composition between the images and to control the operation of the prediction unit 61. FIG. 9A to FIG. 9D are images obtained by the imaging unit using the CMOS image sensor in chronological order. In these images, each image is divided into a region 91, a region 92, and a region 93. In the CMOS image sensor imaging unit, the images can be obtained in chronological order so that, as shown at points (i.e., timings) A, B, and C of FIG. 9A, the obtaining timing of the image signal in each region can be made different.

For example, if there is a feature point in the region 91 that is a predetermined region, coordinate information of the solid black circles 94 to 97 in FIG. 9E can be obtained from the image obtained at the timing A. The timing A does not have a large delay with respect to the start timing for obtaining the next image, so, if the feature point is in a predetermined region in which the read-out is fast, blur correction may be performed by using the information. Additionally, if there is a feature point in the region 92, the coordinate information of the solid black circles 98, 99, 910, and 911 in FIG. 9F can be obtained from the image obtained at the timing B. If there is a feature point in the region 93, the coordinate information is obtained from the image obtained at the timing C in a manner similar to that in FIG. 4F. If the image is obtained at the timing B, the prediction accuracy by the prediction unit 61 can increase because the time from the actual measurement to the prediction is shorter than that obtained at the timing C. It is also possible to reduce a prediction load and to improve prediction accuracy by controlling the prediction unit 61, based on the region in which the feature point in the image exists, as described above.

Figure 10:
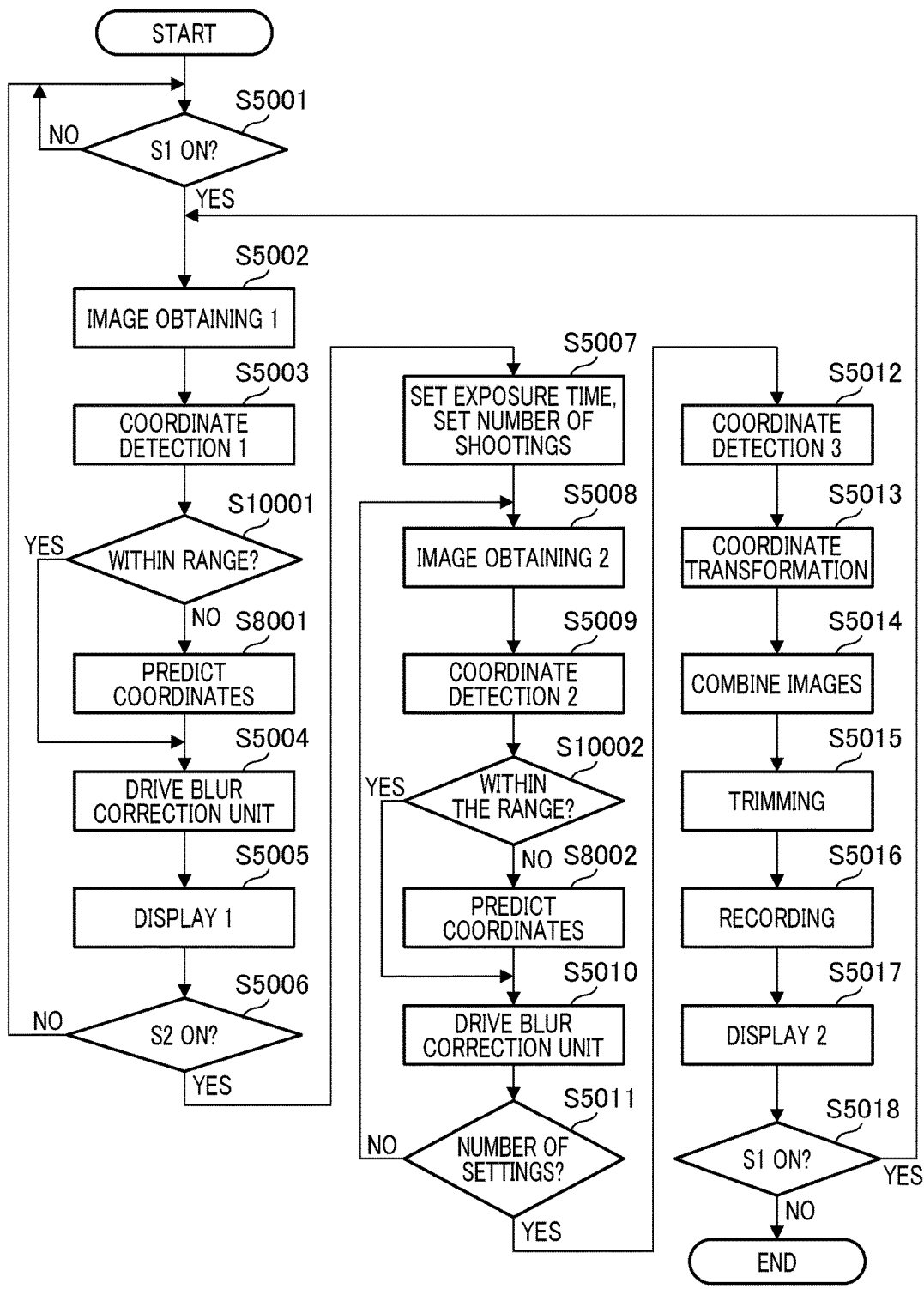
FIG. 10 is a flowchart of an imaging operation in the second embodiment.

FIG. 10 is a flowchart that explains a flow of the imaging operation in the case in which the imaging unit 13 is a CMOS image sensor. The same reference numerals are given for steps that are the same as those in the flowchart of FIG. 8 and the description thereof will be omitted. In step S10001, the prediction unit 61 determines whether or not the feature point of the coordinate signals sequentially transmitted from the first coordinate detection unit 18 that has performed coordinate detection in step S5003 exists in the region 91 of FIG. 9A. If the feature point of the coordinate signals exists in the region 91, the step S8001 that performs prediction is skipped, and the process proceeds to step S5004.

Additionally, also in step S10002, the prediction unit 61 similarly determines whether or not the feature point of the coordinate signals sequentially transmitted from the first coordinate detection unit 18 that has performed the coordinate detection in step S5009 exists in the region 91 of FIG. 9A. If the feature point exists in the region 91 of FIG. 9A, the next step S8002 is skipped and the process proceeds to step S5010. As described above, if the imaging unit 13 is a CMOS image sensor, the operation of the prediction unit 61 can be controlled based on where the feature point is located in the image, whereby the predicted load can be reduced.

Third Embodiment

Figure 11:
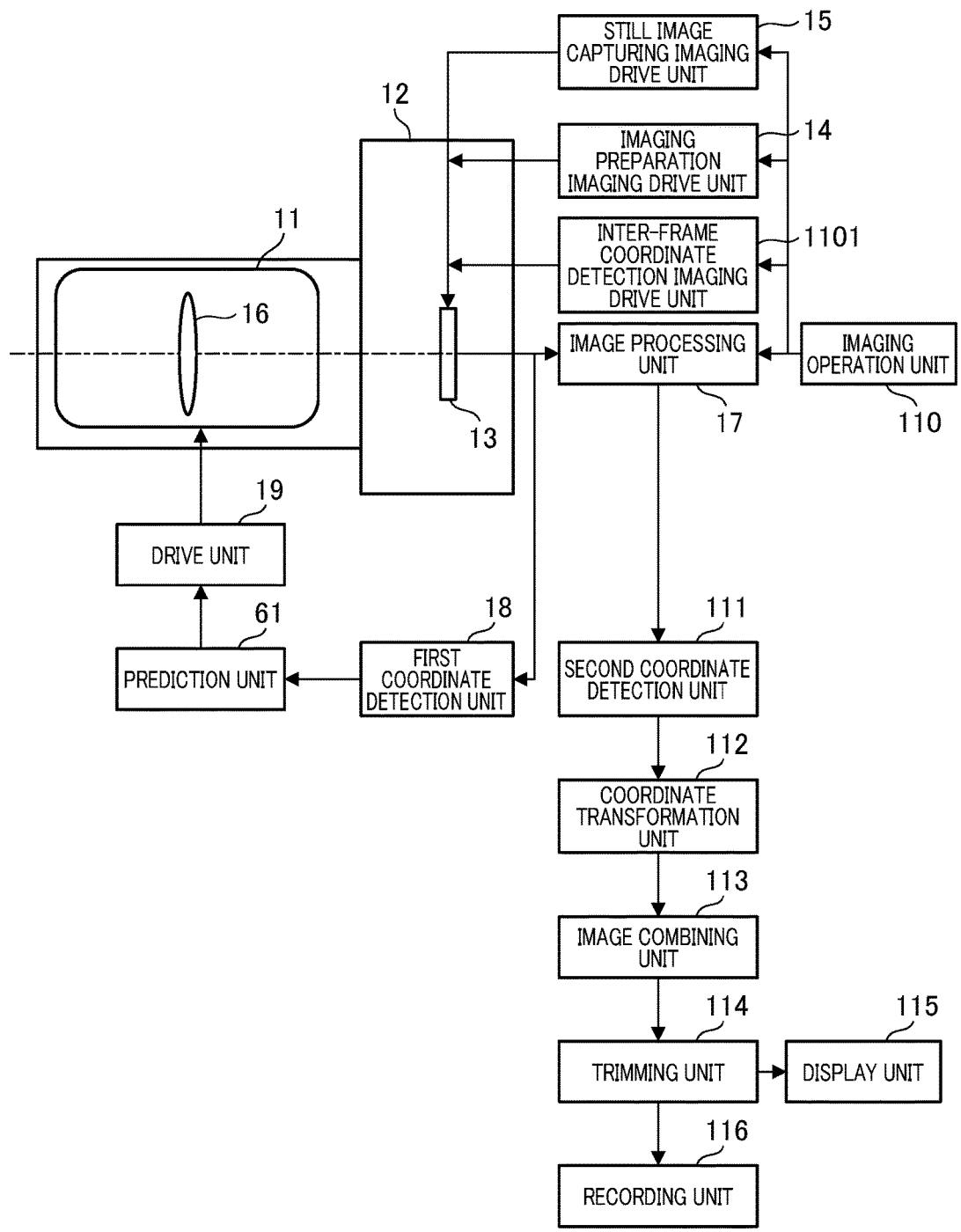
FIG. 11 is a block diagram illustrating a configuration of the imaging apparatus in the third embodiment.

FIG. 11 is a block diagram illustrating a configuration of the imaging apparatus to which the third embodiment is applied. FIG. 11 is different from FIG. 6 in that an inter-frame coordinate detection imaging drive unit (inter-frame coordinate unit) 1101 is provided. The inter-frame coordinate unit 1101 drives the imaging unit 13 so as to obtain an inter-frame image to be used for coordinate detection of a difference in composition between the images while obtaining a plurality of still images for making a combined image.

In the first embodiment and the second embodiment, the first coordinate detection unit 18 obtains the coordinate information for the difference in composition between the images from the image obtained for still images, and the drive unit 19 drives the blur correction unit 16 based on the information that has been obtained. In the third embodiment, the obtaining of an inter-frame image for obtaining the coordinate information is performed between the exposures of still images. This inter-frame image may be a small-sized image and it is not necessary to adjust the exposure time to the exposure of still images. Because of the obtaining of the images inserted into between continuous imaging of still images, the exposure time is preferably short, which does not disturb the intervals of continuous imaging as much as possible within the range in which the coordinate information of the feature point can be obtained.

Figure 12:
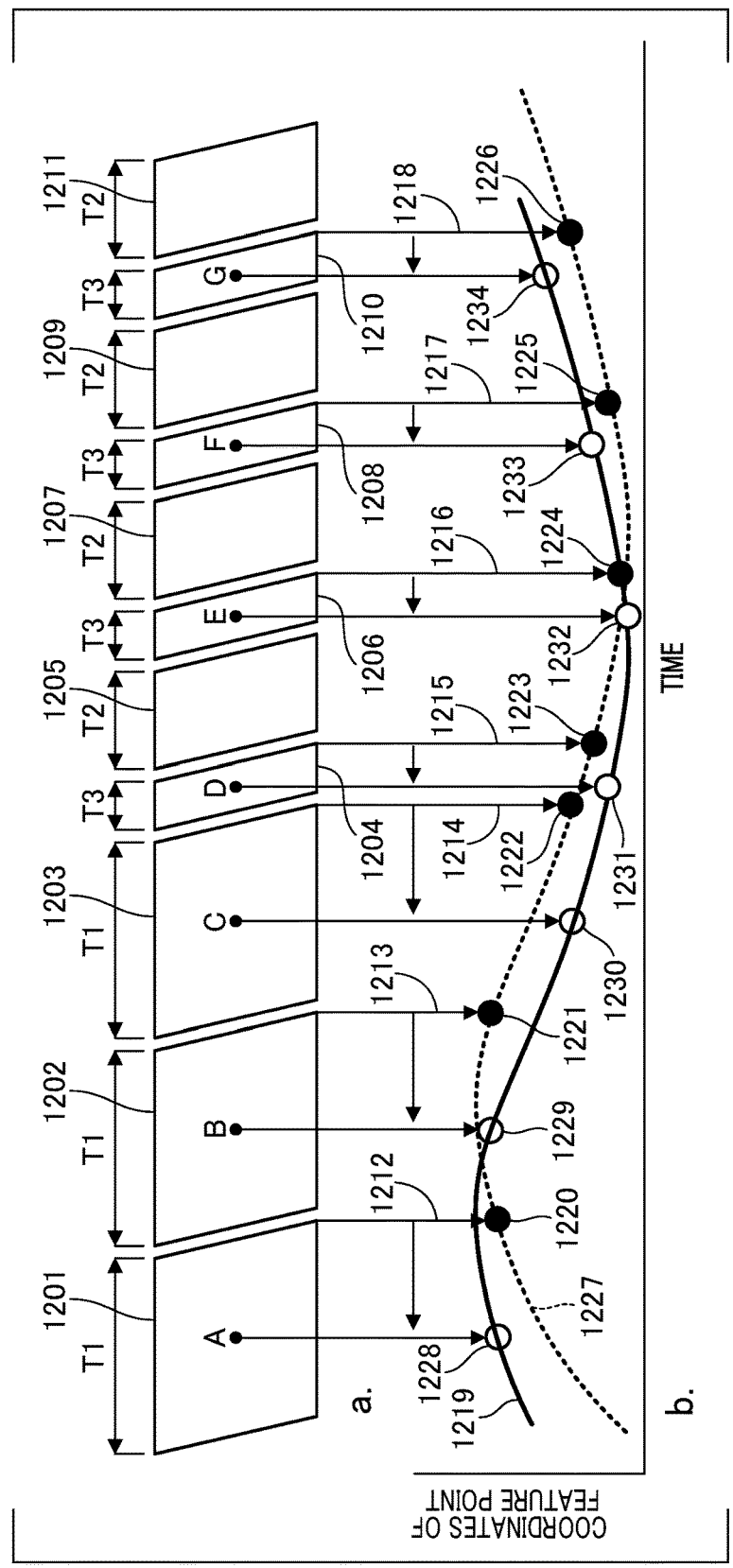
FIG. 12 illustrates the correction of a difference in composition between images during imaging in the third embodiment.

The operation of the inter-frame coordinate unit 1101 will be described with reference to FIG. 12. FIG. 12 illustrates the correction of the difference in composition between the images during imaging according to the third embodiment. In FIG. 12, images 1201 to 1203 are used for object observation during imaging preparation and the imaging unit 13 obtains an image in accordance with an instruction provided from the preparation drive unit 15. Exposure time T1 of these images is set to an exposure time and the like that is suitable for the imaging of moving images and the like, for example, 1/30 second or 1/60 second.

An image 1205, an image 1207, an image 1209, and an image 1211 are images for obtaining still images, and the imaging unit 13 obtains the images in accordance with an instruction provided from the imaging drive unit 14. Exposure time T2 of these images is set to a time, for example, 1/60 second, that less affects image quality deterioration due to image blur based on the focal length of the imaging optical system and the object distance. An image 1204, an image 1206, an image 1208, and an image 1210 are inter-frame images for obtaining coordinate information between the intervals of imaging of still images, and the imaging unit 13 obtains the images in accordance with an instruction provided from the inter-frame coordinate unit 1101. Exposure time T3 of these inter-frame images is set to, for example, 1/120 second, which is the shortest time allowing a brightness that ensures obtaining the coordinate information from the inter-frame images.

Here, it is assumed that, in the image for preparation, the image for still image capturing, and the inter-frame image, the image information is obtained at the timing of arrows 1212 to 1218, and the coordinate information is calculated. In FIG. 12, a solid line 1219 shows a change of difference in composition between the images due to image blur during image obtaining. Black solid circles 1220 to 1222 represent coordinate information obtained after the image obtaining of each of the images 1201 to 1203, and black solid circles 1223 to 1226 represent coordinate information obtained after image obtaining of the inter-frame images 1204, 1206, 1208, and 1210. A dashed line 1227 is a difference in composition between the images based on these pieces of the coordinate information.

Black outline circles 1228 to 1234 are predicted coordinate information predicted by the prediction unit 61 based on the previous coordinate information (including the black solid circles 1220 to 1226) and coordinate prediction results in the central timing A to G in each image obtaining region obtained in chronological order. The drive unit 19 drives the blur correction unit 16 based on a tracing obtained by the black outline circles 1228 to 1234 (which is the same as the change of difference in composition between the image due to image blur shown by the solid line 1219), whereby imaging can be continued while favorably correcting the difference in composition between the images. Additionally, the coordinate information can be obtained from each image of the images for still image capturing, and the predicted coordinate information can be obtained by the prediction unit 61 also based on the coordinate information in each image obtaining timing. It is possible to perform a smoother and more accurate blur correction by performing blur correction also using the predicted coordinate information.

As described above, coordinate information can be obtained from an image having a size that is the same as image obtaining for imaging preparation between the intervals of image obtaining for still images, whereby it is possible to obtain stable coordinate information in a series of operations from imaging preparation to imaging of still images. Hence, in the third embodiment, stable image blur correction can be performed by inserting an image for obtaining coordinate information between the intervals of capturing of still images, and, as a result, the quality of the combined image can be further improved. Smooth blur correction is also possible by subdividing the timing for obtaining coordinate information for each region of the image.

Fourth Embodiment

In the first to third embodiments, although the detection of the coordinates of each image in the first coordinate detection unit 18 and the second coordinate detection unit 111 is performed by obtaining the coordinates of one feature point, the present invention is not limited thereto. For example, a plurality of feature points may be set in each image, and coordinates of the feature points may be detected. For example, if a moving object is shot, the coordinates are detected by using only the feature points set in the main object. In contrast, if a stationary object is shot, the coordinates are detected by using the feature point(s) set in the entire imaging region and the feature point(s) set in the main object. The imaging apparatus may be provided with a switching means that determines whether a target to be shot is a moving object or a stationary object, and then switches shooting modes (detection method) based on the determined result. The switching means determines whether or not the main object is a moving object, for example, by a function that detects a face and an animal. By switching the obtaining method of the coordinate information depending on the objects, more accurate correction can be performed and the quality of the image can be improved. Note that, in the above four embodiments, the example in which the imaging apparatus performs image combining and trimming has been described. The imaging apparatus may, however, be configured to perform optical blur correction during imaging for obtaining an image used for image combining and the obtained image may be transmitted outside and combined by an external device. Additionally, in the above four embodiments, although the example in which the lens is moved for performing the optical blur correction has been described, the imaging element of the imaging unit 13 may be moved.

Other Embodiments

Embodiment of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)), and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus that performs positioning of a plurality of images that has continuously been captured by an image sensor, the imaging apparatus comprising:
 (A) at least one memory; and
 (B) at least one processor coupled to the at least one memory and functioning as:
  (a) a detection unit configured to detect a difference in position between the images of the plurality of images captured by the image sensor;
  (b) a drive unit configured to drive a shake correction unit that optically corrects image blur of each image, of the plurality of images, based on the difference in position detected by the detection unit; and
  (c) a coordinate transformation unit configured to perform positioning of the images, of the plurality of images, in which the image blur has been corrected by the shake correction unit, based on the difference in position detected by the detection unit.

2. The imaging apparatus according to claim 1, wherein the processor functions as (d) a prediction unit that predicts a difference in position of an image to be obtained next based on the difference in position detected by the detection unit, and
wherein the drive unit drives the shake correction unit based on the difference in position predicted by the prediction unit.

3. The imaging apparatus according to claim 2, wherein the detection unit detects a feature point of each image, of the plurality of images, and detects the difference in position based on the coordinate information of the feature point between the images of the plurality of images.

4. The imaging apparatus according to claim 3, wherein the prediction unit predicts the coordinate information of the feature point of the image to be obtained next based on the difference in position detected by the detection unit.

5. The imaging apparatus according to claim 3, wherein the image sensor is a CMOS image sensor, and
wherein the drive unit drives the shake correction unit based on the difference in position detected by the detection unit if the feature point detected by the detection unit is within a predetermined region, and the drive unit drives the shake correction unit based on the difference in position predicted by the prediction unit if the feature point detected by the detection unit is not within the predetermined region.

6. The imaging apparatus according to claim 2, wherein the prediction unit has a Kalman filter.

7. The imaging apparatus according to claim 1, wherein the image sensor obtains an inter-frame image while capturing the plurality of images, and wherein the detection unit detects a difference in position between the images, of the plurality of images, and the inter-frame image.

8. The imaging apparatus according to claim 1, wherein the processor functions as (d) the shake correction unit that optically corrects image blur of each image, of the plurality of images.

9. The imaging apparatus according to claim 1, wherein the at least one processor further functions as (d) an image combining unit configured to combine the images to which the positioning has been performed by the coordinate transformation unit and to generate a combined image.

10. The imaging apparatus according to claim 9, wherein the at least one processor further functions as (e) a trimming unit that trims the combined image combined by the image combining unit and that generates a recorded image.

11. A control method of controlling an imaging apparatus that performs positioning of a plurality of images that has continuously been captured the control method comprising the steps of:

capturing the plurality of images using an image sensor;

detecting a difference in position between the plurality of images that has been captured by the image sensor;

driving a shake correction unit that optically corrects an image blur of each image, of the plurality of images, based on the difference in position that has been detected in the detecting step; and performing positioning of the images in which the image blur has been corrected by the shake correction unit, based on the difference in position that has been detected in the detecting step.

12. The control method according to claim 11, further comprising the step of generating a combined image by combining the images in which the positioning has been performed in the performing positioning step.

* * * * *